United States Patent [19]

Takada

[11] Patent Number: 5,146,604

[45] Date of Patent: Sep. 8, 1992

[54] INFORMATION FILING APPARATUS THAT STORES AND ERASES INFORMATION BASED ON FREQUENCY OF ITS USE

[75] Inventor: Yasufumi Takada, Yokohama, Japan

[73] Assignee: Canon Kabushiki Kaisha, Tokyo, Japan

[21] Appl. No.: 655,186

[22] Filed: Dec. 13, 1991

Related U.S. Application Data

[63] Continuation of Ser. No. 55,515, May 29, 1987, abandoned.

[30] Foreign Application Priority Data

Jun. 6, 1986 [JP] Japan .................. 61-131436

[51] Int. Cl.$^5$ .................. G06F 12/00; G06F 13/00
[52] U.S. Cl. .................. 395/425; 364/243; 364/243.41; 364/246.12; 364/246.13; 364/DIG. 1; 365/218
[58] Field of Search ... 364/200 MS File, 900 MS File; 365/425, 189.01, 230.03, 218

[56] References Cited

U.S. PATENT DOCUMENTS

| | | | |
|---|---|---|---|
| 3,729,712 | 4/1973 | Glassman | 364/900 |
| 4,322,795 | 3/1982 | Lange et al. | 364/200 |
| 4,332,014 | 5/1982 | Nakazawa et al. | 364/900 |
| 4,366,551 | 12/1982 | Holtz | 364/900 |
| 4,408,181 | 10/1983 | Nakayama | 382/61 |
| 4,413,317 | 11/1983 | Swenson | 364/200 |
| 4,437,155 | 3/1984 | Sawyer et al. | 364/200 |
| 4,442,488 | 4/1984 | Hall | 364/200 |
| 4,458,310 | 7/1984 | Chang | 364/200 |
| 4,507,729 | 3/1985 | Takahashi | 364/200 |
| 4,530,054 | 7/1985 | Hamstra et al. | 364/200 |
| 4,607,331 | 8/1986 | Goodrich, Jr. et al. | 364/200 |
| 4,636,946 | 1/1987 | Hartung et al. | 364/200 |
| 4,758,980 | 7/1988 | Tsunekawa et al. | 364/900 |
| 4,811,203 | 3/1989 | Hamstra | 364/200 |
| 4,931,984 | 6/1990 | Ny | 364/900 |
| 5,043,885 | 8/1991 | Robinson | 364/200 |

*Primary Examiner*—Michael R. Fleming
*Assistant Examiner*—Gopal C. Ray
*Attorney, Agent, or Firm*—Fitzpatrick, Cella, Harper & Scinto

[57] ABSTRACT

An information filing apparatus includes a controller that stores input information in a first file unit, selects information which satisfies a first requisite among the information stored in the first file unit and stores the selected information in a second file unit. The controller further selects the information which satisfies a second requisite among the information stored in the second file unit, and erases the just selected information from the second file unit.

31 Claims, 7 Drawing Sheets

FIG. 5

| D1 | D2 | D3 | D4 | D5 | D6 | D7 | D8 | D9 | D10 |
|---|---|---|---|---|---|---|---|---|---|
| NO. | KEY WORD | DATE OF REGISTRATION | NUMBER OF PAGES | COMMENT | ADDRESS IN ELECTRONIC FILE 2a | STORE IN ELECTRONIC FILE 2b? | ADDRESS IN ELECTRONIC FILE 2b | NUMBER OF SEARCHES | LATEST SEARCH DAY |
| 1 | CANON FILE | 84.10.3 | 1 | | (ADDRESS) | — | — | 0 | — |
| 2 | CANON MICRO | 84.10.10 | 3 | | (ADDRESS) | — | (ADDRESS) | 13 | 84.12.5 |
| 3 | A B C D E | 84.11.3 | 1 | | (ADDRESS) | — | (ADDRESS) | 5 | 84.11.10 |
| 4 | X Y Z | 84.11.30 | 1 | | (ADDRESS) | YES | — | 0 | — |
| 5 | F F G | 84.12.9 | 10 | | (ADDRESS) | | | 0 | — |

FIG. 9

| NO. | MANAGEMENT DATA (D1) | NUMBER OF SEARCHES (D9) | LATEST SEARCH DAY (D10) | ADDRESS IN ELECTRONIC FILE 2a (D6) |
|---|---|---|---|---|
| 1 | 106 | 12 | 84.11.3 | ADDRESS |
| 2 | 21 | 11 | 84.12.1 | ADDRESS |
| 3 | 3321 | 11 | 83.5.6 | ADDRESS |
| 4 | 50 | 7 | 84.6.3 | ADDRESS |

FIG. 10

| NO. | MANAGEMENT DATA (D1) | NUMBER OF SEARCHES (D9) | LATEST SEARCH DAY (D10) | ADDRESS IN ELECTRONIC FILE 2b (D8) |
|---|---|---|---|---|
| 1 | 203 | 0 | 82.3.4 | (ADDRESS) |
| 2 | 42 | 0 | 82.5.6 | (ADDRESS) |
| 3 | 38 | 0 | 82.6.5 | (ADDRESS) |
| 4 | 503 | 1 | 83.2.15 | (ADDRESS) |

INFORMATION FILING APPARATUS THAT STORES AND ERASES INFORMATION BASED ON FREQUENCY OF ITS USE

This application is a continuation of application Ser. No. 07/055,515 filed May 29, 1987, now abandoned.

BACKGROUND OF THE INVENTION

1. Field of the Invention

This invention relates to an information filing apparatus.

2. Related Background Art

Recently, office automation has rapidly progressed. Thus there is an increasing tendency that computers are incorporated into office devices which are in turn are interconnected via telecommunication circuits. In order to cope with such computerization and interconnection, it is desirable to use information, to be handled, as electrical signals as much as possible. What satisfies this demand is an electronic filing system which uses an electronic file (a photo disc, a photomagnetic disc, etc.) which converts image information to a digital signal and records it thereon.

The electronic filing system has the big feature that it can record a great amount of image information with high density in the form of an electrical signal to thereby realize reduction of a space for information storage, and high speed search. However, the electronic filing system has the drawback that as the accumulation of information increases, the speed of its search decreases.

In order to solve this problem, applicant has filed Japanese Patent Application No.57899/1985 (Unexamined Published Patent Application No.216022/1986) in which image information read as by a reader is all stored in an erasable photomagnetic disc and image information not so often used is transferred to and stored in an additionally writable non-erasable photo disc. This causes image information used very often to be left in the photomagnetic disc to prevent a decrease in the search efficiency. However, the images which are used very often are stored only in the photomagnetic disc, consequently the important images are in danger of being erased erroneously.

SUMMARY OF THE INVENTION

It is an object of this invention to provide an information filing apparatus which eliminates the above drawback.

It is another object of this invention to provide an information filing apparatus which prevents a decrease in the efficiency of searching a great amount of accumulated information by combining an additionally recordable type memory medium and a rewritable memory medium effectively.

Other objects of this invention will now be apparent from the following description thereof taken in conjunction with the accompanying drawings and claims.

BRIEF DESCRIPTION OF THE DRAWINGS

FIG. 5 is a schematic view of an external memory.

FIGS. 9 and 10 illustrate the concept of a list made at the external memory in accordance with the frequency of search during the respective file maintenance processes.

DETAILED DESCRIPTION OF THE PREFERRED EMBODIMENTS

An embodiments of this invention will now be described in detail with reference to the drawings.

Figure 1:
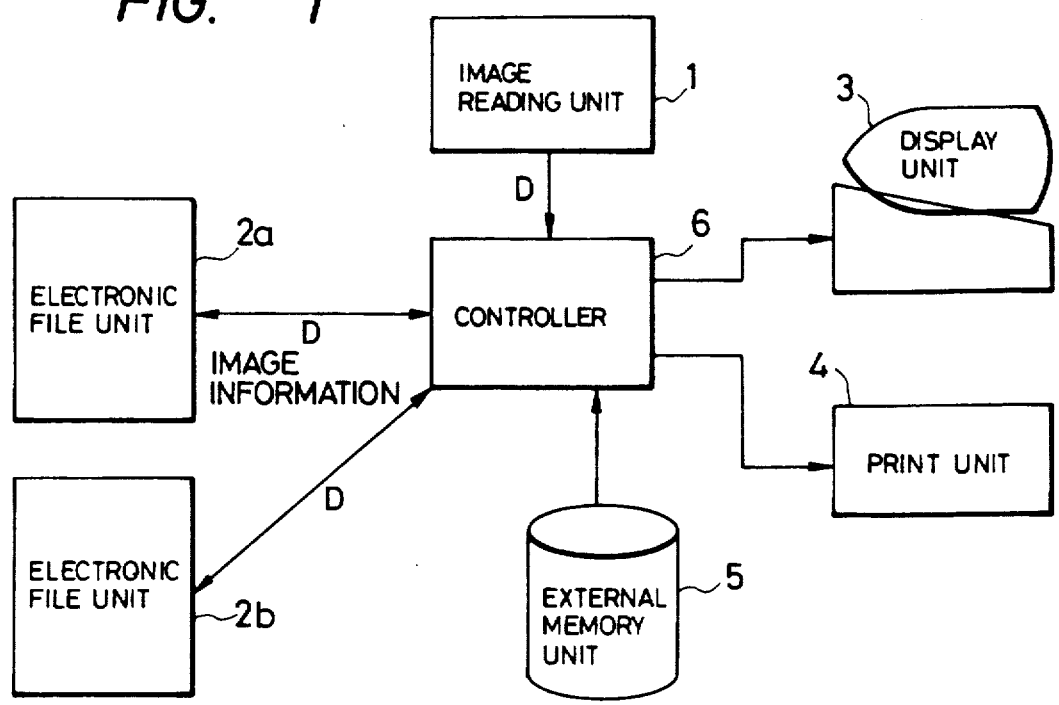
FIG. 1 is a block diagram showing one embodiment of an information filing apparatus according to this invention.

FIG. 1 is a block diagram showing one embodiment of an information filing apparatus according to this invention. A controller 6 is connected to an image reading unit 1, electronic file units 2a, 2b, a display unit 3, a print unit 4 and an external memory unit 5.

Image reading unit 1 includes, for example, a charge coupled device and scans a document in rasters and converts the information in the document to electric signals.

Electronic file units 2a and 2b transmit and receive image information D to and from controller 6, store the information in a memory medium and/or read the information from the memory medium for reproduction. The memory medium used in file unit 2a is of write once type or unerasable additionally-writable type, for example, of an additionally recordable photo disc. The memory medium used in file unit 2b is of erasable type, for example, of erasable, additionally recordable and rewritable disc, for example, photomagnetic disc. Preferably, both the memory mediums of the units 2a and 2b have a large capacity and are of a random access type.

Display unit 3 receives image information D read from electronic file unit 2a or 2b via controller 6 and displays it as a visual image. Display unit 3 may be a CRT. Display unit 3 is provided with a keyboard which keys in operation commands and search items, etc., and displays the result of the search etc., on the CRT.

Print unit 4 is operated by a control signal and image information D from controller 6 and records an image on a sheet of recording paper and may be a laser beam printer or an ink jet printer.

External memory unit 5 stores search data on the information stored in electronic file units 2a, 2b, condition data as to whether or not the information stored in electronic file unit 2a should be copied into electronic file unit 2b, data as to whether or not the information should be stored in file unit 2b, condition data for determining whether or not certain data should be erased from file unit 2b. Each time one of these operations including such search is performed, controller 6 updates the content of external memory unit 5. Memory unit 5 may include a magnetic disc, for example Electronic file unit 2b may also have the function of memory unit 5.

Search data on image information to be newly stored in file unit 2a is keyed in at the keyboard of display unit 3 and delivered via controller 6 to external memory unit 5.

The operations of the respective above units are controlled by controller 6 which contains a program memory (ROM) which stores control operation processes, a work memory (RAM), an image memory, a microcomputer (MPU), etc.

Figure 2:
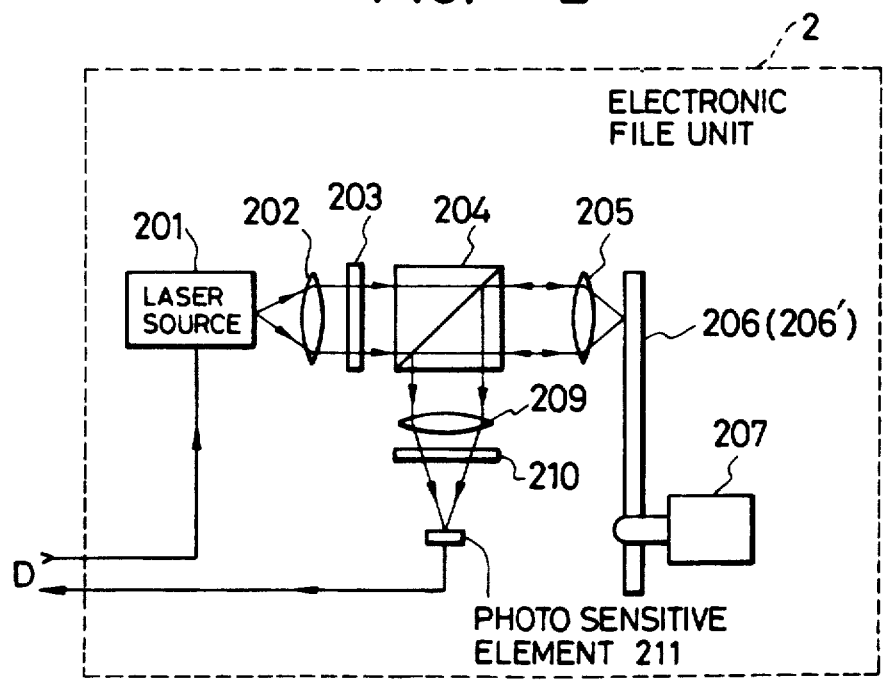
FIG. 2 is a view showing one example of an electronic filing unit.

FIG. 2 illustrates one embodiment of electronic file units 2a and 2b.

Figure 3:
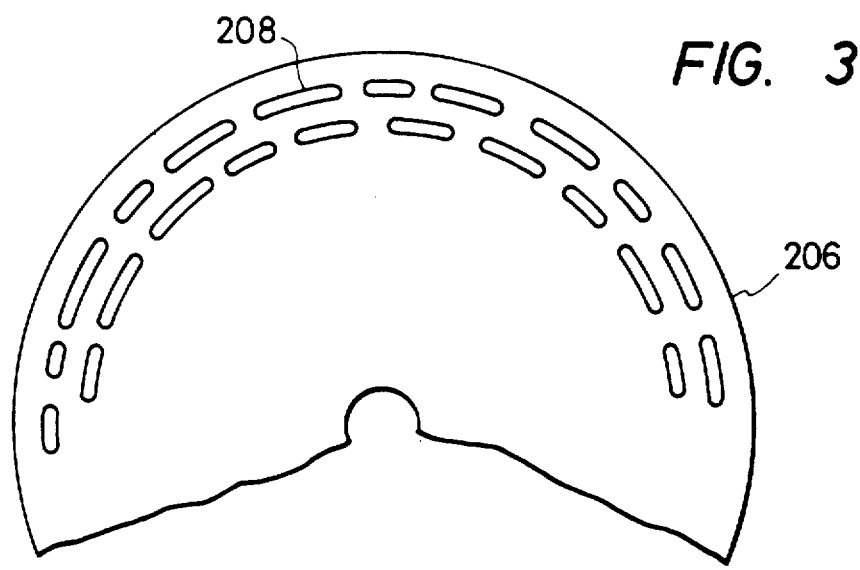
FIG. 3 is a view explaining an electronic filing and recording unit.

FIG. 3 is a schematic plan view of a part of a recording surface of a photo disc and a photomagnetic disc used for electronic file units 2a and 2b.

First, electronic file unit 2b will be mainly described.

In FIG. 2, a laser light source 201 outputs a light beam modulated by image information D input from controller 6. This modulated light beam is changed by a collimator lens to parallel rays which pass through a polarizer 203, a beam splitter 204 and focused by a focusing lens 205 on to a photomagnetic disc 206. The diameter of this beam spot is about 1 μm. The magnetic film formed on disc 206 is magnetized uniformly in advance in one direction. Only the area to which the beam spot is applied is inverted in the direction of magnetization in accordance with a rise in the temperature due to the beam spot and an external magnetic field applied to the film. Since the beam spot is modulated by digital image information D, a train of long-short inverted magnetized bits 208 corresponding to image information D is formed on disc 206 which is rotated by a motor 207 at a predetermined speed (see FIG. 3).

Photomagnetic disc 206 is formed by depositing a magnetic film of Gd, Tb, Fe, Dy, etc., on to a disc of glass or plastic by sputtering.

As described above, when the image information recorded on disc 206 is to be reproduced, the intensity of the light beam output from laser light source 201 is first maintained at a constant value lower than when recording is to be performed. Such light beam is applied to bits 208 on disc 206. Since bits 208 are inverted in the direction of magnetization, reflected light whose polarized plane is rotated is obtained by magnetic Kerr effect. Therefore, rotation of disc 206 at the same speed as during recording produces a series of reflected rays whose polarized planes have changed corresponding to the recorded image information.

The direction of such reflected rays is changed by beam splitter 204 via a focusing lens 205 and the resulting rays are input via a focusing leans 209 to an analizer 210. The reflected rays passing through analyzer 210 become intermittent corresponding to the image information recorded on disc 206. Such reflected rays are input to a photo sensitive element 211 (such as a photodiode) where the rays are recovered as an electrical signal of image information D and output to controller 6.

Controller 6 outputs the input image information D to display unit 3 which displays the image recorded on disc 206 at the CRT or the like. The information may be recorded on a sheet of paper by print unit 4.

Not shown clearly in FIG. 2 electronic file unit 2 has a seeking mechanism to move the beam spot to a desired position during search, in addition to a tracking control and a focus control mechanism.

The information recorded on disc 206 can be erased by applying to the disc a strong external magnetic field having the same direction as that in which the disc is magnetized before recording. Thus new information can be again recorded on the disc. The same may be said of file unit 2a. In this case, an additionally recordable type photo disc is used as the memory medium. Electronic file unit 2a will now be described with reference to FIG. 2. File unit 2a is different from unit 2b only in that it includes an additionally recordable type photo disc 206' and not a rewritable photomagnetic disc 206.

Disc 206' is formed by vapor depositing two layers of alloys of Bi/Te and Sb/Se on to a glass or plastic disc by sputtering. If a beam spot is focused on to the disc as in the previous manner, the heat produced will activate the two types of alloys to form a quaternary alloy. Thus the reflectance of the beam spot is different between an unrecorded portion and the portion alloyed by the beam spot. Image recording similar to that by the photomagnetic disc is performed on the basis of this principle. In this case, once quaternary alloying is performed, the recording is stabilized and cannot be erased any longer. However, this is a merit of long time storage on the other hand. Since an unrecorded portion is not changed during reproduction, a light beam weaker than the light beam used during recording is applied to the disc to reproduce an image signal depending upon the difference in reflectance. The remaining structural and operative points are similar to the corresponding ones in file unit 2b.

Figure 4:
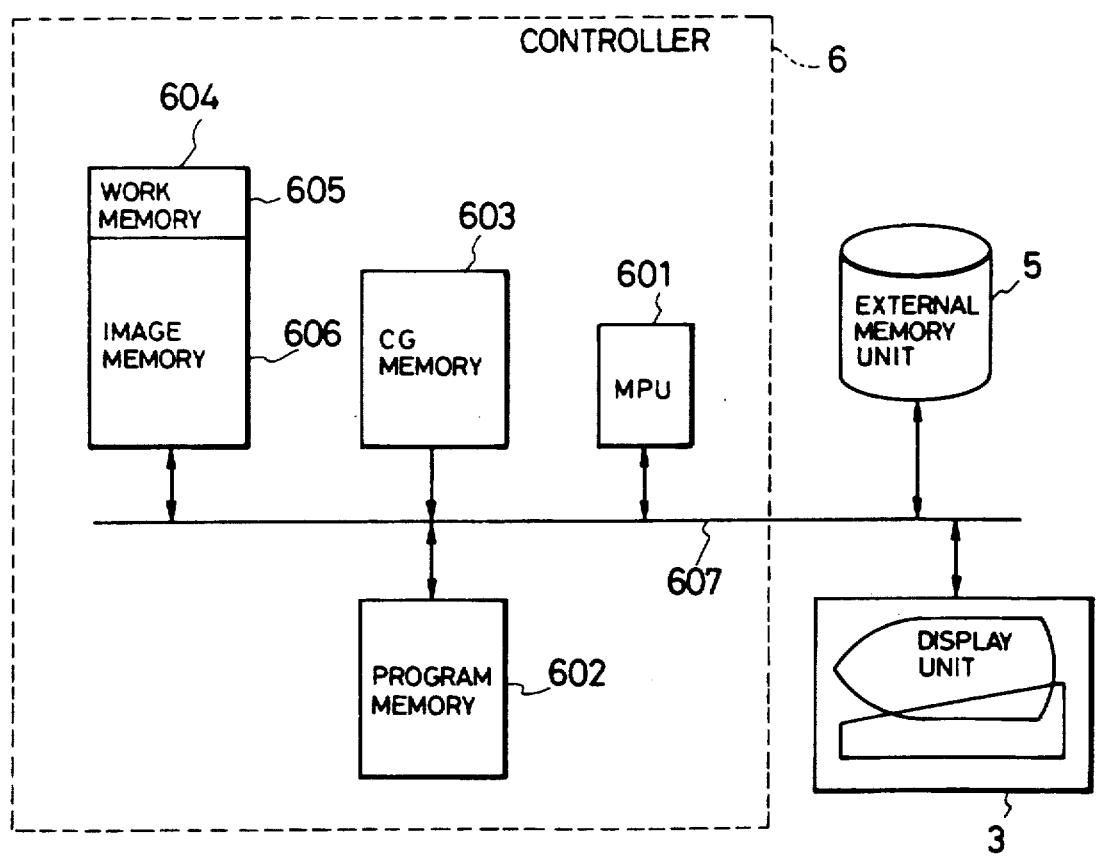
FIG. 4 is a block diagram showing one example of a control unit used in the embodiment.

FIG. 4 is a block diagram showing one example of controller 6. In FIG. 4, a microcomputer 601 (hereinafter referred to as the MPU) which performs various control operations, a program memory 602 for sequence control, a CG memory 603 which stores pattern information for display of characters and signs on to a display 3, and a memory 604 (including a work memory 605 and an image memory 606) are interconnected via buses (control bus, data bus, etc.) 607. Data and control signals are output to all other devices via buses 607 while controller 6 receives data from the respective devices via buses 607. Display unit 3 can display thereon the content of image memory 606 in bit correspondence, and characters corresponding to code information (for example, ASCII codes) by referring to CG memory 603. Of course, codes can be keyed in from the keyboard.

The operation of the above embodiment will now be described. FIG. 5 illustrates one example of a management data file stored in external memory unit 5.

First, image information such as a picture or a document is read and converted by image reading unit 1 to an electrical signal which is stored via controller 6 into electronic file unit 2a.

The search data on image information is recorded in external memory unit 5 via controller 6 from the keyboard of image display unit 3. Namely, the operator uses the keyboard to input search data on image information stored in file unit 2a. The search data includes a key word, date of registration, the number of pages for image information and data as to whether or not the image information should be stored in file unit 2b.

FIG. 5 illustrates the concept of a management data file made on the basis of the search data stored in external memory unit 5.

In registration, a management data number D1 is allocated to each set consisting of search data D2, D3, D4, D5 input from the keyboard of display unit 3. In addition, an address D6 in electronic file unit 2a that controller 6 automatically allocates, the number of searches D9 counted automatically, and the final search data D10 are added to each set of search data. The number of searches D9 and the final search data D10 become index data for file maintenance to be described later in more detail. The index for the file maintenance is an item determined in accordance with an application and may be data except for the number of searches and the final search data.

The number of searches may be cleared to 0 in accordance with a predetermined number of dates passing since the latest search date.

The image information instructed to be stored in file unit 2b in accordance with the content of the item of D7 is stored in file unit 2b and an address D8 in file unit 2b is given to the management data file in the file maintenance process.

The file maintenance will now be described which is necessary for updating image information for file units 2a and 2b.

Figure 6:
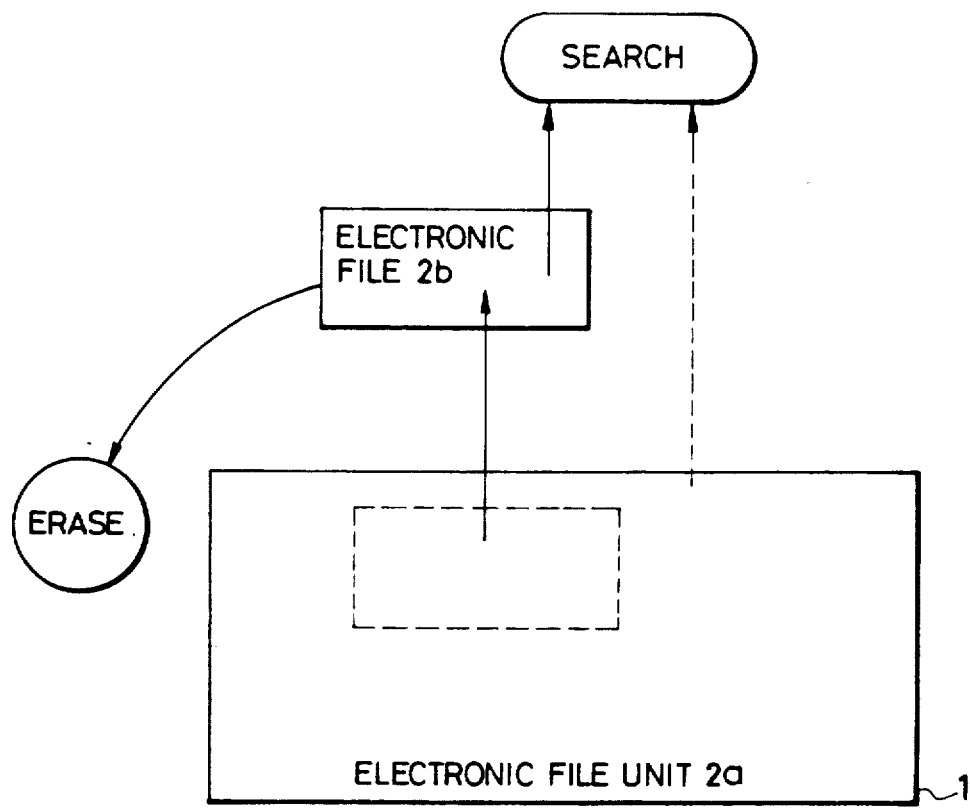
FIG. 6 illustrates the concept of a file.

FIG. 6 illustrates the concept of image information stored in file units 2a and 2b.

In the information filing apparatus, electronic file unit 2a stores all the image information read by reading unit 1 and extracts only image information with high frequency of search and stores it in file unit 2b.

Figure 7:
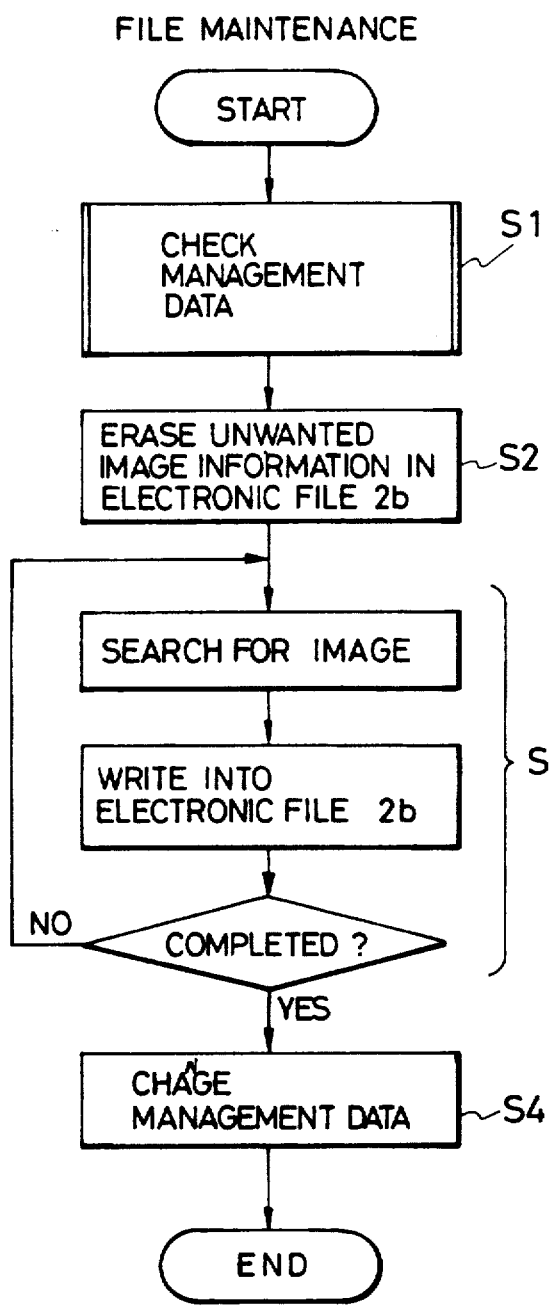
FIGS. 7 and 8 are each a flowchart showing a file maintenance process.

FIG. 7 is a flowchart showing the file maintenance process.

First, in accordance with the instructions by the operator, the file maintenance process starts and MPU 601 checks a management data file in external memory unit 5 (S1).

Figure 8:
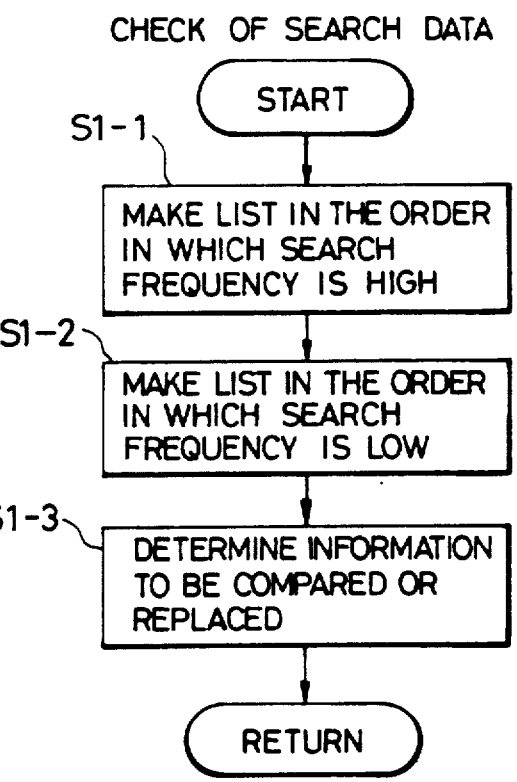

The details of this checking are shown in FIG. 8.

First, for the image information stored in file unit 2a but not in file unit 2b, a list of management data arranged in the order in which search frequency is high is made (S1-1). FIG. 9 shows one example of this list. For the image information stored in file unit 2b, a list of management data arranged in the order in which search frequency is low is made (S1-2). FIG. 10 shows one example of this list. These two lists are made within external memory unit 5.

Items of these two lists are compared sequentially from above in one-to-one correspondence to find and extract a reversal between two search frequencies to determine image information to be erased from file unit 2b and image information to be stored newly in file unit 2b (S1-3). If the image information stored in the file unit 2b among management data having the same order in the management data lists has a lower frequency of use than the information in the file unit 2b, the image information stored in file unit 2b will be determined to be erased from file unit 2b while if the image information stored only in file unit 2a has a higher frequency of use than the information in the file unit 2b, the image information stored in file unit 2a will be determined to be stored in file unit 2b.

MPU 601 instructs file unit 2b to erase image information, which should be erased, from the file unit to thereby secure an empty space in the file unit (S2).

MPU 601 instructs file unit 2a to search image information to be stored newly in file unit 2b and reads the information D into image memory 606. MPU 601 also instructs file unit 2b to search an empty space in the file unit to write the image information D, read into image memory 606, into the empty space (S3).

At step S1-3 when it is determined that the information should be stored in file unit 2b, the management data file in external memory unit 5 is updated (S4). Namely, the address D8 in file unit 2b is erased/written. Processing such as clearing the number of searches to 0 is performed in accordance with the number of dates which have passed since the latest search date.

It is to be noted that when image information is recorded in file unit 2a of this system, the information which is directed in advance to be stored in file unit 2b is stored preferentially in file unit 2b.

Figure 11:
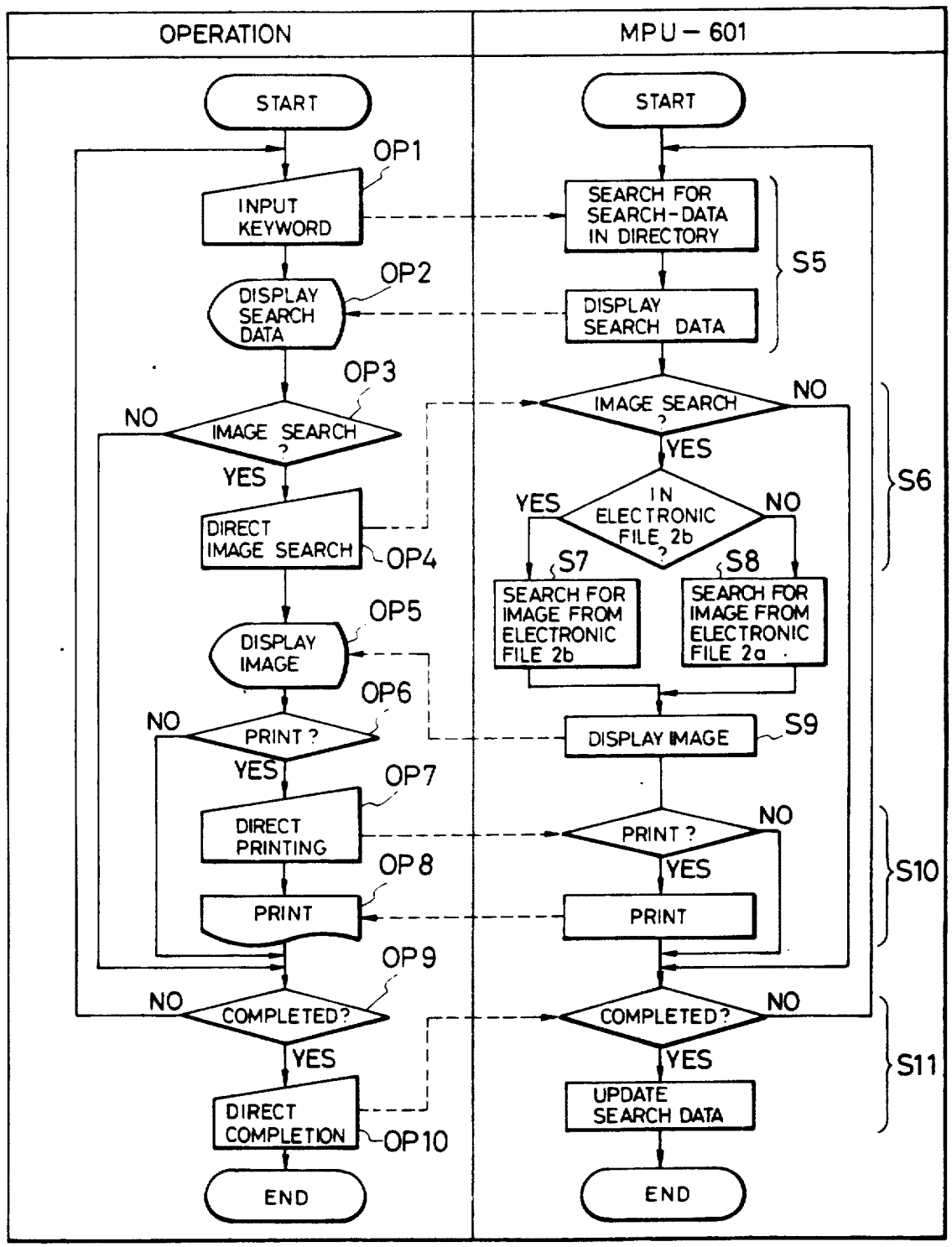
FIG. 11 is a flowchart for executing a search process.

FIG. 11 is a flowchart showing the search process. In FIG. 11, the left flowchart shows the operation mainly while the right flowchart shows the action of MPU 601.

First, the operator inputs a key word for required image information from the keyboard of display unit 3 (OP1). MPU 601 searches management data corresponding to the input keywords from a directory (FIG. 5) of the external memory unit, inputs the data into work memory 604 of controller 6 and displays the management number, the date of registration, etc., on the display of display unit 3 (S5).

The operator views the displayed search data (OP2) to determine whether or not the image information should be searched (OP3). If not, the operator inputs the keywords for next search (OP1) or directs completion (OP10).

If search is directed from the keyboard of display unit 3 when the image concerned is to be searched, MPU 601 determines from the management data taken into the work memory 604 whether or not the image information has been stored in file unit 2b (S6).

If the information has been stored in file unit 2b MPU 601 outputs the address D8 of the management data in file unit 2b to same to search for the image (S7).

If the image data is not stored in file unit 2b, the address D6 of file unit 2a for search data is output to file unit 2a to search the image (S8).

The searched and read image information D is stored in image memory 606 of controller 6 and displayed on display unit 3. The operator determines by watching the displayed image (OP5) whether or not the information should be printed on a sheet of recording paper (OP6). If the information should be printed, the operator directs printing from the keyboard of display unit 3 (OP7). When MPU 601 receives the directions for printing, it instructs printing unit 4 to output the image information D in image memory 606 to printing unit 4 for printing (S10).

If the operator performs the next search after printing (OP8), the above operations starting with OP1 are repeated. If these operations are completed, the operator direct completion from the keyboard of display unit 3 (OP9, OP10). When MPU 601 receives the directions for completion, it inclements the number of searches by one for a directory, the image information of which has been searched, among the directories in the management data file in external memory unit 5, updates the latest search date and completes the operations (S11).

As described above, the search speed of the information filing apparatus of this embodiment is not reduced although stored information increases, due to a combination of two electronic file units different in character. Namely, all the information is managed by an additionally recorded type photodisc unit which uses a write once type memory medium stable as a "static file". Only information having a high frequency of use among the information is managed by a photomagnetic disc which uses an erasable type memory medium as a "dynamic file". Information having a low frequency of use in the dynamic file is erased by the self-regulation of the system while information having a high frequency of use in the static file is copied into the dynamic file to maintain constant the quantity of information in the dynamic file.

Therefore, no matter how much information in the static file or in the information filing apparatus may increase, the quantity of information in the dynamic file is maintained constant at all times, so that the high speed search by the present information filing apparatus will not be impaired.

An autochanger which automatically exchanges a memory medium in electronic file unit 2a by a command from controller 6 may be used in order to cope with a large increase in the quantity of information. Even if information in the erasable type memory medium should be erased wrongly, backup is possible because all the information is recorded in a write once type memory medium.

The file maintenance process may be performed automatically, for example, weekly or monthly using a calendar timer backup by a battery and built in the filing apparatus. It is to be noted that the file maintenance process should be performed while the registration or search process is not being performed.

The invention may be applicable to not only image information but also character information.

It is to be noted that this invention should not be limited to the above embodiment and may be modified in various forms within the scope of claims.

I claim:

1. An information filing apparatus comprising:
   a plurality of memory mediums, comprising at least a first and a second memory medium;
   information input means for inputting information to be stored into at least one of said plurality of memory mediums;
   first filing means for storing the input information input by said information input means into said first memory medium and for reading out information stored in said first memory medium;
   second filing means for copying a part of the information stored in said first memory medium to said second memory medium and reading out information stored in said second memory medium, wherein said second filing means comprises erasing means for erasing information stored in said second memory medium;
   retrieving information input means for inputting retrieval information for retrieval of a desired information stored in said first and second memory mediums;
   storage means for storing a retrieval history of the information retrieved; and
   control means (1) for retrieving information from said first and second memory mediums on the basis of the retrieval information input by said retrieving information input means, wherein said control means determines which one of said first and second memory mediums the information to be retrieved has been stored into, and retrieves the information from said first or said second memory medium on the basis of such determination so that information is retrieved from said second memory medium when the information is stored in at least said second memory medium, and (2) for determining which information in said first memory medium is to be copied to said second memory medium in accordance with the retrieval history and initiating the copying of the determined information, wherein said control means determines which information is to be copied, in accordance with the retrieval history of the information which has been frequently used, and (3) for determining information to be erased in said second memory medium and initiating the erasing of the determined information, wherein said control means determines which information is to be erased, in accordance with the retrieval history of the information which has been infrequently used.

2. An information filing apparatus according to claim 1, wherein said storage means counts a number of times the retrieved information has been retrieved, said count forming a part of the retrieval history used by said control means.

3. An information filing apparatus according to claim 1, wherein said storage means stores a date from a calendar timer when the retrieved information is retrieved.

4. An information filing apparatus according to claim 1, wherein said first memory medium comprises an unerasable additionally-writable type medium.

5. An information filing apparatus according to claim 1, wherein the second memory medium comprises erasable writable type medium.

6. An information filing apparatus according to claim 1, wherein said plurality of memory mediums further comprises a third memory medium, wherein said control means causes to be stored in said third memory medium management information for managing the information stored in said first and second memory mediums, and rewrites the management information stored in said third memory medium in accordance with recording of information into and erasing of information from said second memory medium.

7. An information filing apparatus according to claim 6, wherein said control means concurrently controls the information being stored in said first and second memory mediums on the basis of the management information.

8. An information filing apparatus according to claim 6, wherein said management information includes a recording address of information for said first or second memory medium.

9. An information filing apparatus according to claim 6, wherein the management information includes a retrieval key word of information stored in said first and second memory mediums which is used by said control means together with the retrieval information input by said retrieving information input means to retrieve the information from said first and said second memory mediums.

10. An information filing apparatus according to claim 1, wherein said control means retrieves information from said first or second memory medium on the basis of common retrieval information inputted by said retrieving information input means.

11. An information filing apparatus according to claim 1, wherein, when the information to be retrieved has been stored in both said first and said second memory mediums, said control means retrieves the information from said second memory medium.

12. An information filing apparatus comprising:
   a plurality of memory mediums, comprising at least a first and a second memory medium;
   information input means for inputting information to be stored into at least one of said plurality of memory mediums;
   first filing means for storing the input information input by said information input means into said first memory medium and for reading out information stored in said first memory medium;
   second filing means for copying a part of the information stored in said first memory medium to said second memory medium and for reading out information stored in said second memory medium, wherein said second filing means comprises erasing means for erasing information stored in said second memory medium;

retrieving information input means for inputting retrieval information for retrieval of information stored in said first and second memory mediums;

storage means for storing a number of retrievals of the information retrieved; and control means for retrieving information from one of said first and second memory mediums on the basis of the retrieval information input by said retrieving information input means and for, on the basis of the number of retrievals stored in said storage means, allowing information in said first memory medium whose number of retrievals is larger than a first predetermined value to be stored into said second memory medium and allowing information in said second memory medium whose number of retrievals is smaller than a second predetermined value to be erased from said second memory medium.

13. An information filing apparatus according to claim 12, wherein said first memory medium includes an optical disk.

14. An information filing apparatus according to claim 12, wherein said second memory medium includes a magnetic-optical disk.

15. An information filing apparatus according to claim 12, wherein said control means compares the number of retrievals of information in said first memory medium with the number of retrievals of information in said second memory medium, and controls, on the basis of such comparison, storing of information into said second memory medium and erasing of information from said second memory medium.

16. An apparatus for managing a plurality of information stored in first and second filing means, said first filing means being capable of storing information and said second filing means being capable of storing and erasing information with the plurality of information stored in said first and second filing means being retrievable based on retrieval information, said apparatus comprising:

management means for counting and storing a number of retrievals of each of the plurality of information stored in said first and second filing means, said management means comprising a memory medium which stores the number of retrievals of each of the plurality of information; and controls means for, on the basis of the number of retrievals stored in said memory medium, allowing information stored in said first filing means whose number of retrievals is larger than a first predetermined value to be stored into said second filing means and allowing information stored in said second filing means whose number of retrievals is smaller than a second predetermined value to be erased from said second filing means.

17. An apparatus according to claim 16, wherein said first filing means stores information on an optical disk.

18. An apparatus according to claim 16, wherein said second filing means stores information on a magnetic-optical disk.

19. An apparatus according to claim 16, wherein said control means compares the number of retrievals of information in said first filing means with the number of retrievals of information in said second filing means, and controls the storing of information into said second filing means and erasing of information from said second filing means based on the comparison.

20. An apparatus for managing a plurality of information stored in first and second filing means, said first filing means being capable of storing information and said second filing means being capable of storing and erasing information, said apparatus comprising:

a memory medium for storing a retrieval history of information stored in said first and second filing means; and control means (1) for retrieving information from said first and second filing means on the basis of retrieval information input by retrieving information input means, wherein said control means determines which one of said first and second filing means the information to be retrieved has been stored into, and retrieves the information from said first or said second filing means on the basis of such determination so that information is retrieved from said second filing means when the information is stored in at least said second filing means, and (2) for determining which information in said first filing means is to be stored in said second filing means in accordance with the retrieval history stored in said memory medium and based on which information has been frequently used, and initiating the copying of the determined information, and (3) for determining which information in said second filing means is to be erased in accordance with the retrieval history information stored in said memory medium and based on which information has been infrequently used, and initiating the erasing of the determined information.

21. An apparatus according to claim 20, wherein said control means counts the number of times the retrieved information has been retrieved and stores the number of times in said memory medium as part of the retrieval history used by said control means.

22. An apparatus according to claim 20, wherein said memory medium stores a date from a calendar timer when the retrieved information is retrieved.

23. An apparatus according to claim 20, wherein said control means stores in said memory medium management information for managing the information stored in said first and second filing means, and rewrites the management information stored in said memory medium in accordance with the recording of information into and erasing of information from said second filing means.

24. An apparatus for managing a plurality of information stored in first and second memory mediums, said first memory medium begin capable of storing information and said second memory medium being capable of storing and erasing information with the plurality of information stored in said first and second memory mediums being retrievable based on retrieval information, said apparatus comprising:

management means for counting and storing a number of retrievals of the plurality of information stored in said first and second memory mediums, said management means having a third memory medium which stores the number of retrievals of each of the plurality of information;

generating means for generating a maintenance instruction for performing a maintenance processing to arrange information stored in said second memory medium; and control means for performing, in response to the maintenance instruction from said generating means, the maintenance processing on the basis of the number of retrievals stored in said third memory medium so that information in said first memory medium whose number of retrievals is larger than a first predetermined value is stored into said second memory medium and information in said second memory medium whose number of retrievals is smaller than a second predetermined value is erased from said second memory medium.

25. An apparatus according to claim 24, wherein said first memory medium includes an optical disk.

26. An apparatus according to claim 24, wherein said second memory medium includes a magnetic-optical disk.

27. An apparatus according to claim 24, wherein said control means compares the number of retrievals of information in said first memory medium with the number of retrievals of information in said second memory medium, and controls the storing of information into said second memory medium and erasing of information from said second memory medium based on the comparison.

28. An apparatus for managing a plurality of information stored in first and second memory mediums, said first memory medium being capable of storing information and said second memory medium being capable of storing and erasing information, said apparatus comprising:
- a third memory medium for storing a retrieval history of information stored in said first and second memory mediums;
- generating means for generating a maintenance instruction for performing a maintenance processing to arrange information stored in said second memory medium; and
- control means (1) for retrieving information from said first and second memory mediums on the basis of retrieval information input by retrieving information input means, wherein said control means determines which one of said first and second memory mediums the information to be retrieved has been stored into, and retrieves the information from said first or said second memory medium on the basis of such determination so that information is retrieved from said second memory medium when the information is stored in at least said second memory medium, and (2) for determining, in response to the maintenance instruction, which information in said first memory medium is to be stored in said second memory medium in accordance with the retrieval history stored in said third memory means and based on which information has been frequently used, and initiating the copying of the determined information, and (3) for determining, in response to the maintenance instruction, which information in said second memory medium is to be erased in accordance with the retrieval history information stored in said third memory means and based on which information has been infrequently used, and initiating the erasing of the determined information.

29. An apparatus according to claim 28, wherein said control means counts the number of times the retrieved information has been retrieved and stores the number of times in said memory medium as part of the retrieval history used by said control means.

30. An apparatus according to claim 28, wherein said third memory medium stores a date from a calendar timer when the retrieved information is retrieved.

31. An apparatus according to claim 28, wherein said control means stores in said third memory medium management information for managing the information stored in said first and second memory mediums, and rewrites the management information stored in said third memory medium in accordance with recording of information into and erasing of information from said second memory medium.

* * * * *

UNITED STATES PATENT AND TRADEMARK OFFICE
CERTIFICATE OF CORRECTION

PATENT NO. : 5,146,604

DATED : September 8, 1992

INVENTOR(S) : YASUFUMI TAKADA

Page 1 of 2

It is certified that error appears in the above-identified patent and that said Letters Patent is hereby corrected as shown below:

ON THE TITLE PAGE,

[22] FILED

"Dec. 13, 1991" should read --Feb. 13, 1991--.

COLUMN 8

Line 17, "able writable" should read --able-writable--.

COLUMN 10

Line 53, "begin" should read --being--.

COLUMN 12

Line 27, "memory medium" should read --third memory medium--.

COLUMN 1

Line 16, "are" (second occurrence) should be deleted.
Line 33, "problem," should read --problem, the--.
Line 36, "read as by" should read --as read by--.

COLUMN 2

Line 30, "write once" should read --write-once--.

COLUMN 3

Line 34, "effect" should read --effect.--.

UNITED STATES PATENT AND TRADEMARK OFFICE
CERTIFICATE OF CORRECTION

PATENT NO. : 5,146,604
DATED : September 8, 1992
INVENTOR(S) : YASUFUMI TAKADA

It is certified that error appears in the above-identified patent and that said Letters Patent is hereby corrected as shown below:

COLUMN 6

Line 43, "direct" should read --directs--.
   Line 55, "write" should read --write- --.

COLUMN 7

Line 9, "write once" should read --write-once--.

Signed and Sealed this

Second Day of November, 1993

Attest:

BRUCE LEHMAN

Attesting Officer     Commissioner of Patents and Trademarks